United States Patent [19]
Reznak

[11] Patent Number: 5,926,652
[45] Date of Patent: Jul. 20, 1999

[54] MATCHING OF WILD CARD PATTERNS TO WILD CARD STRINGS ASSOCIATED WITH NAMED COMPUTER OBJECTS

[75] Inventor: Frederick J. Reznak, Cary, N.C.

[73] Assignee: International Business Machines Corporation, Armonk, N.Y.

[21] Appl. No.: 08/770,969

[22] Filed: Dec. 20, 1996

[51] Int. Cl.⁶ ............................... G06F 7/04; G06F 17/30
[52] U.S. Cl. ............................................. 395/898; 707/6
[58] Field of Search ................................ 395/898, 899, 395/186, 187.01; 704/2, 3, 4, 5; 707/1, 3, 4, 5, 6

[56] References Cited

U.S. PATENT DOCUMENTS

| | | | |
|---|---|---|---|
| 4,450,520 | 5/1984 | Hollaar et al. | 395/885 |
| 4,489,435 | 12/1984 | Moshier | 704/244 |
| 4,550,436 | 10/1985 | Freeman et al. | 382/218 |
| 4,674,066 | 6/1987 | Kucera | 707/5 |
| 4,955,056 | 9/1990 | Stentiford | 704/239 |
| 5,260,778 | 11/1993 | Kauffman et al. | 348/6 |
| 5,303,150 | 4/1994 | Kameda | 704/9 |
| 5,392,428 | 2/1995 | Robins | 707/3 |
| 5,442,699 | 8/1995 | Arnold et al. | 380/4 |
| 5,510,981 | 4/1996 | Berger et al. | 704/2 |
| 5,555,343 | 9/1996 | Luther | 704/260 |

*Primary Examiner*—Parshotam S. Lall
*Assistant Examiner*—Viet Vu
*Attorney, Agent, or Firm*—John J. Timar; Felsman, Bradley, Gunter & Dillon, LLP

[57] ABSTRACT method of matching computer wild card patterns involves comparing first and second character strings associated with named objects residing on a computer system to determine whether the first character string defines a first group of computer objects which is a logical subset of a second group of computer objects defined by the second character string. The first character string is provided by a user; such as in a command line, and the second character string is pre-defined, such as by a network administrator. The method can be performed by examining whether the second character string has any wild card character which can substitute for one and only one character, or by examining whether the second character string has any wild card character which can substitute for any number of characters, including no characters (a universal character). The second character string can further be examined to see if it contains any embedded sequence of characters having no universal wild card character.

17 Claims, 3 Drawing Sheets

MATCHING OF WILD CARD PATTERNS TO WILD CARD STRINGS ASSOCIATED WITH NAMED COMPUTER OBJECTS

BACKGROUND OF THE INVENTION

1. Field of the Invention

The present invention generally relates to computer systems and more particularly to "wild card" characters which are used to specify computer objects, such as files or directories, having names which match a pattern that uses the wild card characters.

2. Description of the Prior Art

Conventional computer-operating systems have various architectures for handling software objects, like files, directories and symbolic links. These filing systems allow for the naming of objects according to certain rules. For example, in the popular DOS operating system used with personal computers, a name can be up to eight characters, optionally followed by a period (".") and an extension of up to three more characters, except that certain characters are not allowed including, among others, the forward slash ("/"), backslash ("\"), colon (":"), asterisk ("*") and question mark ("?"). These latter two characters are particularly reserved for use as "wild cards" (dummy or substitute characters) in specifying or selecting files from a group of files. The asterisk symbol can represent any character, including none, while the question mark represents exactly one character. For example, the expression "123*.*" presents a wild card pattern that would include the files or directories named "123," "1234," "123X," 123.BAT," etc., and the expression "123?" would include "1234" and "123X," but not "123" or "123.BAT." Other operating systems (VM, UNIX, etc.) have similar wild card enablement. Naming conventions are used for other computer objects or resources besides files, such as hardware (peripheral) devices.

Sometimes it is necessary to compare two wild card patterns, such as a user-specified pattern against a pre-defined pattern. This comparison can be performed by security-type software, e.g., for a network to restrict access to or manipulation of computer objects residing on the network, or for a single workstation which supports multiple users with different access rights to data stored locally. For example, a system administrator often will want to prevent certain files from being deleted or modified by any users, and can use conventional security software to construct a table having a list of files to which access rights are to be restricted. Conversely, a table can be constructed with a list of files or devices which are to be considered completely accessible. These tables can include wild card patterns, like "*.exe" to prevent users from manipulating any object which has an extension indicating that it is an executable file. Then, if a user executes a command such as "delete login.exe," the security software easily recognizes that the specified file is off limits to the user and disables the command before it is passed to the operating system. Instead of specifying an exact file name, the user might specify a wild card expression as well, such as "delete log*.*". Conventional security software will check this wild card pattern against the authorized command pattern(s), and initially determine whether the action is clearly forbidden, clearly allowable, or neither. If neither, then additional monitoring or analysis is required to ensure that files are properly safeguarded. If the action is clearly allowable, however, then the security system passes the command onto the operating system without further involvement.

The comparison between wild card patterns is performed on a literal basis only. In other words, the security program perceives the user-specified wild card pattern as a static object and considers any wild card characters used in the user-specified pattern to be literal values. Because of this approach, a security program can sometimes produce incorrect results. For example, the pattern "?BC" might appear in a security table as a wild card expression for a group of protected files; if a user entered the command "delete *BC" the security program would immediately conclude that the command is completely prohibited since it would interpret the "*" character literally as satisfying the "?" in the pre-defined pattern. This interpretation is incorrect since the command could result in deletion of the file "BC" which would not be a protected file (based on the "?BC" pattern). Conversely, if the pattern "?BC" were defined for a group of files to which access was to be unrestricted, then the command "delete *BC" would be interpreted as clearly allowable, but this might be incorrect since the command could again result in deletion of the file "BC" which might be a protected file. It would, therefore, be desirable and advantageous to devise a method of comparing wild card patterns which treats both strings as active wild card operators and not as literal values.

SUMMARY OF THE INVENTION

It is therefore one object of the present invention to provide an improved method of handling named objects on computer systems using wild card expressions.

It is another object of the present invention to provide such a method which allows for comparison of wild card patterns.

It is yet another object of the present invention to provide such a method that treats wild card characters in both patterns as active wild card operators.

The foregoing objects are achieved in a method of comparing first and second character strings associated with named objects residing on a computer system, each of the character strings having at least one wild card character, generally comprising the step of determining whether the first character string defines a first group of computer objects which is a logical subset of a second group of computer objects defined by the second character string. In an exemplary embodiment, the first character string is provided by a user, such as in a command line, and the second character string is pre-defined, such as by a network administrator. Depending upon the types of wild card operators that are supported by the operating system, filesystem, or user application, the method can be performed by examining whether the second character string has any wild card character which can substitute for one and only one character, or by examining whether the second character string has any wild card character which can substitute for any number of characters, including no characters (a universal character). The second character string can further be examined to see if it contains any embedded sequence of characters having no universal wild card character.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DESCRIPTION OF THE PREFERRED EMBODIMENT

Figure 1:
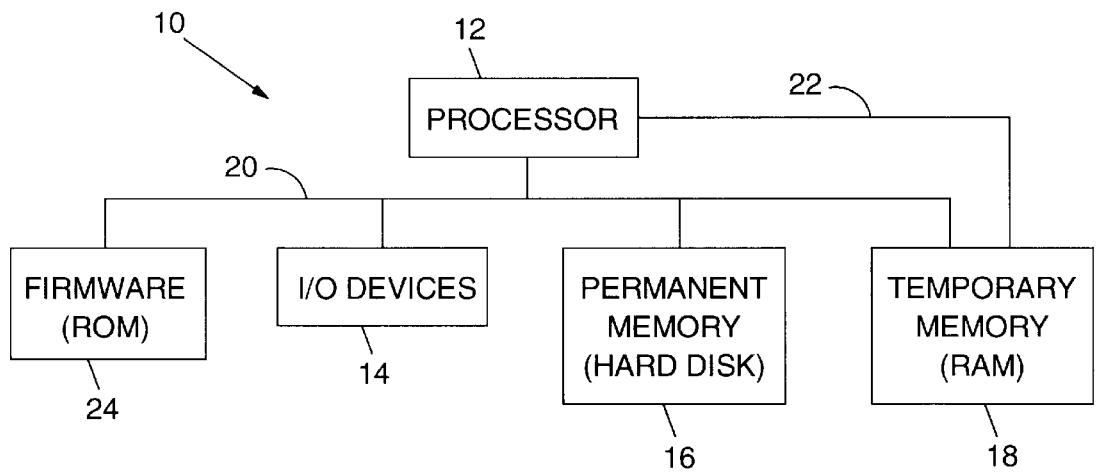
FIG. 1 is a block diagram of one embodiment of a computer system which supports the wild card pattern matching method of the present invention.

With reference now to the FIGS., and in particular with reference to FIG. 1, there is shown a typical computer system 10 that can be adapted according to the present invention. Computer system 10 is generally comprised of a central processing unit (CPU) or processor 12 which is connected to several peripheral devices, including input/output (I/O) devices 14 (such as a display monitor, keyboard and "mouse") for the user interface, a permanent memory device 16 (such as a hard disk or floppy diskette) for storing the computer's operating system and user programs, and a temporary memory device 18 (such as random access memory or RAM) that is used by processor 12 to carry out program instructions. Processor 12 communicates with the peripheral devices by various means, including a bus 20 or a direct channel 22. Computer system 10 also includes firmware 24 whose primary purpose is to seek out and load an operating system from one of the peripherals (usually permanent memory device 16) whenever the computer is first turned on. The process of seeking out and loading the operating system is referred to as "booting" the computer. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor.

As part of the boot process, any (conventional) operating system is loaded which controls devices connected to the processor, and a filesystem is loaded as part of the operating system which enables a user to access and manipulate files on the permanent storage device 16. The operating system and filesystem provide names ("strings") for each device, file, or other file-like object, such as folders or directories (including sub-directories) and symbolic links. The operating system, filesystem, or other software programs such as user applications, may refer to a hypothetical group of files (or devices) using one or more "wild card" characters which act as dummy or substitute characters in specifying a group of files. The wild card pattern may correspond to an empty group, i.e., there may be no files matching the wild pattern. For example, as with prior-art conventions, the asterisk symbol can represent any character, including none, while the question mark can represent exactly one character. In such a case, the expression "*BCDEFG" defines a wild card pattern that may match with several different files, including "ABCDEFG," "1BCDEFG," "_BCDEFG," etc., as well as the one file defined by the representation of the asterisk as no characters, viz., "BCDEFG". The expression "?BCDEFG" defines a wild card pattern that matches several of the same files that match the former expression "*BCDEFG," but the former is actually a subset of the latter, as can be seen with reference to FIG. 2.

Figure 2:
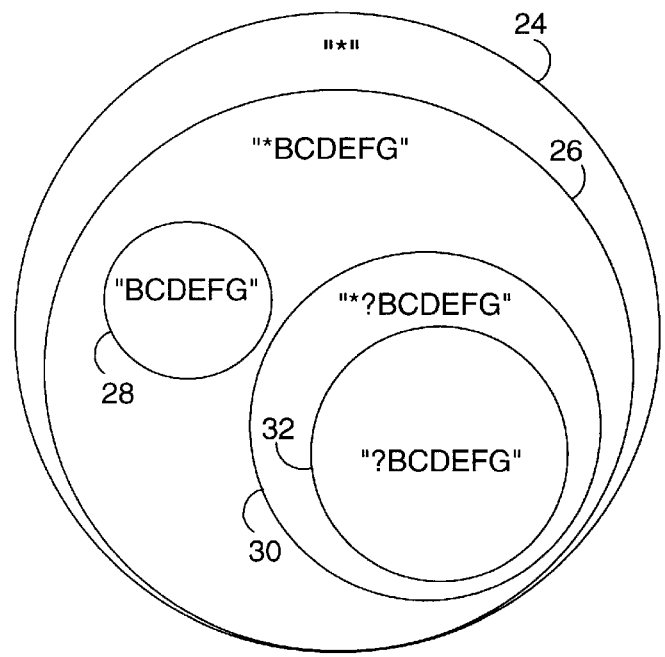
FIG. 2 is a Venn diagram depicting logical subsets of computer filenames using wild card characters.

FIG. 2 is a Venn diagram depicting sets of files that further illustrate the foregoing. Set 24 is the set of all files residing on the particular storage medium, and denoted by the simple wild card expression "*". Within this paramount set 24 are several subsets, one of which is shown as set 26, corresponding to all files that end with the six characters "BCDEFG," and having the wild card specifier "*BCDEFG". Within set 26 are two other notable sets, one set 28 corresponding to the single file defined when the asterisk represent no (a null) character, the file "BCDEFG" (and having an exact length of six characters), and another set 30 corresponding to all other files. All other files can be represented by the wild card pattern "*?BCDEFG". Within set 30 is yet another set 32, that is defined by the asterisk in the preceding pattern being null, viz., "?BCDEFG" (and having an exact length of seven characters). Thus, it can be seen that set 32 is a logical subset of set 26.

The present invention is directed to a method of matching two wild card patterns by examining whether one is such a logical subset of the other. Those skilled in the art will appreciate that other operating systems, filesystems, or user applications may provide different wild card operators besides the asterisk "*" and question mark "?," and that the present invention can be equally applied regardless of the types of wild card characters used, provided the same basic examination takes place to determine whether one wild card pattern is a logical subset of the other. For example, a network security system according to the present invention may be used to define a set of wild card patterns for files to which access may be prohibited, or to which access may be totally unrestricted. More specifically, in the latter case, the network administrator may desire to allow a user to delete any file in a given directory that has seven characters in its name and ends with six specific letters, such as by specifying the wild card pattern "?BCDEFG". Thereafter, if a user enters a "delete" command using a wild card specifier, that specifier can be checked against the pre-defined pattern to determine whether the former is a logical subset of the latter. If so, the user command is fully authorized by the network security system, and so control can be passed from the security system to the normal operating system for completion of the command. Alternatively, if the user-defined (target) string is not a subset of the pre-defined string, then the network security system can refuse to execute the command, or it can individually examine each file name that matches the target string to see if it also matches the pre-defined string, allowing the command to execute for those file names that do match both.

Figure 3A:
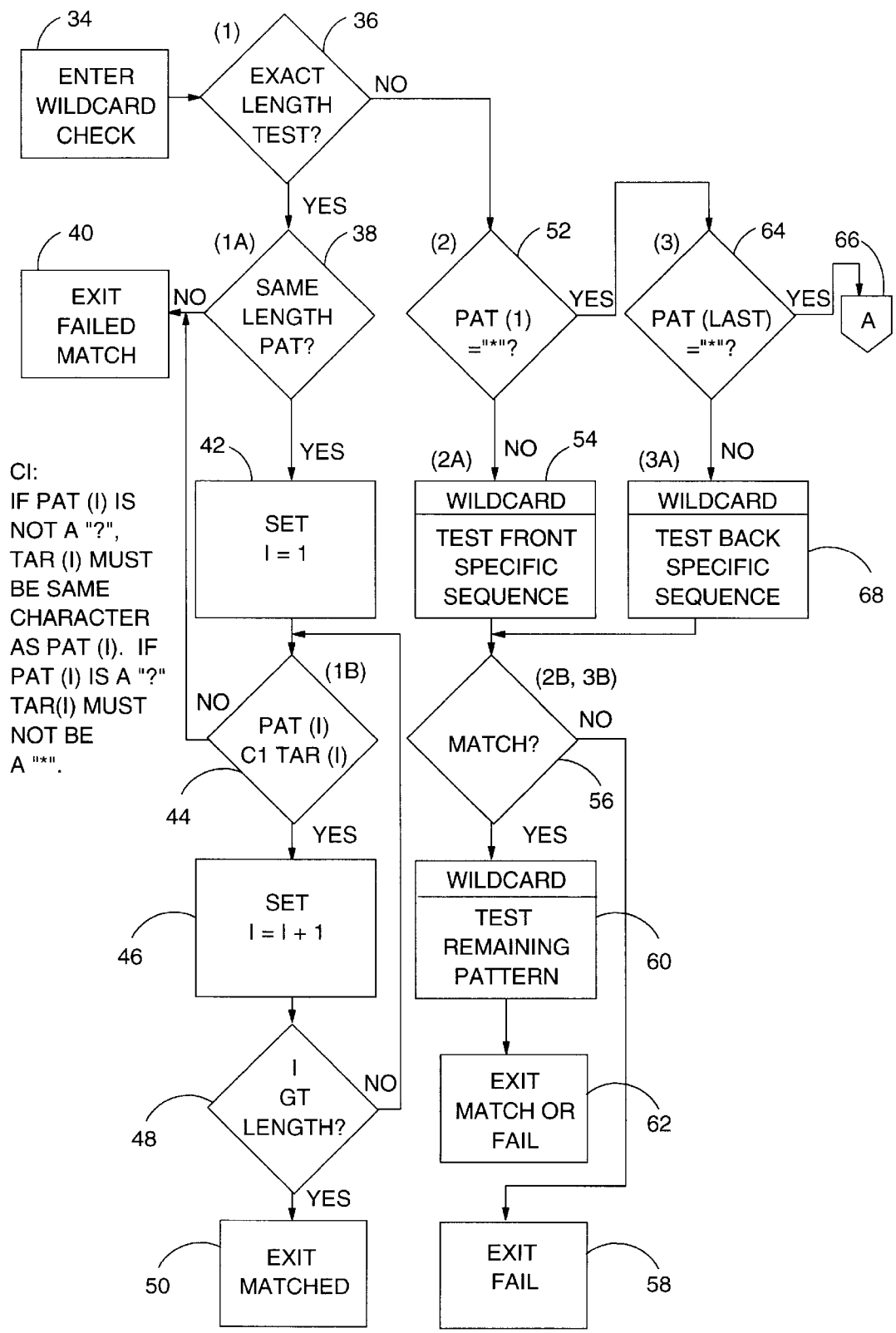
FIGS. 3A and 3B are flow charts depicting one embodiment of the novel method of wild card pattern matching according to the present invention.
Figure 3B:
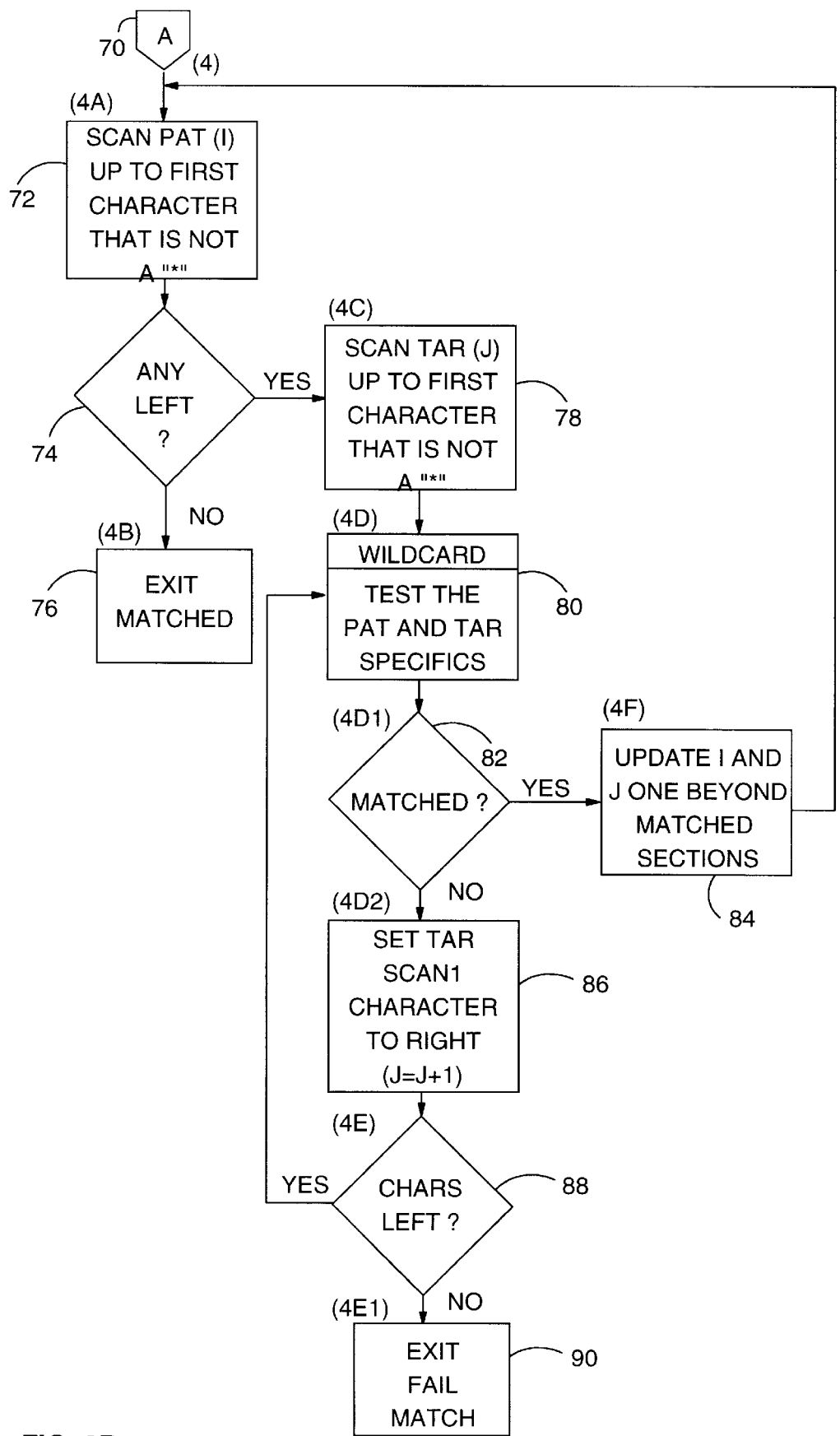

FIGS. 3A and 3B depict a flow chart for one embodiment of software instructions according to the present invention that provides for such wild card pattern matching. The program instructions are called up by, e.g., a network security program (34) which first checks to see if the pre-defined wild card pattern calls for an exact length (36), i.e., the pattern only has question marks "?" for wild card characters (or, conversely, has no asterisks "*"). If so, the user-defined wild card pattern is checked to see if it is the same length (38) as the length of the pre-defined pattern (the program at this point could alternatively check to see if the user-defined pattern has an asterisk "*", in which case the match would fail, but this possibility is inherently addressed in the following steps). If the user-defined pattern does not have the same length, then the program exits as a failed match (40). If the user-defined pattern does have the same length as the pre-defined pattern, then each character in both patterns is consecutively checked, using a counter (I). First the counter is initialized by setting it equal to one (42). Then the first character in the pre-defined pattern is checked against the corresponding character in the user-defined pattern (44). If the character in the pre-defined pattern is not a question mark "?", then the corresponding character in the user-defined pattern must be exactly the same. If the character in the pre-defined pattern is a question mark "?", then the corresponding character in the user-defined pattern can be anything other than an asterisk "*". If either of these conditions are not met, then the program exits as a failed match (40). If both conditions are met, then the counter is incremented (46), and if there are still characters left to check (48), flow returns to 44 for each remaining character. If all characters pass both conditions, then the loop ends and the program exits with a match result (50).

If, initially, step 36 indicates that the pre-defined pattern is not an exact length, then the first character is examined to see if it is an asterisk "*"(52). If not, then the front specific sequence of the pre-defined pattern is checked against the corresponding characters in the user-defined pattern. A "specific sequence" is a sequence of characters which does not have an asterisk "*". The front specific sequence is the group of characters in the pre-defined pattern beginning with the left-most character and ending with the character before any asterisk "*" while scanning from left to right. The front specific sequence is checked according to the exact-length rules in steps 36–50, and those results are examined (56). If this check results in a failed match, then the program exits as such (58). If not, then the program proceeds to test the remaining pattern (60), and exits appropriately as a match or fail (62). This testing is performed according to steps 64–68 which also occur if the first character in the pre-defined string is an asterisk "*". The last character in the pre-defined pattern is examined to see if it is an asterisk "*" (64). If so, then the program flow moves (66) to FIG. 3B as indicated at step A. If not, then the back specific sequence of the pre-defined pattern is checked against the corresponding characters in the user-defined pattern (68). The back specific sequence is the group of characters in the pre-defined pattern beginning with the right-most character and ending with the character before any asterisk "*" while scanning from right to left. The back specific sequence is also checked according to exact-length rules in steps 36–50. If this check results in a failed match (56), then the program exits with this result (58); otherwise, the program tests the remaining pattern (60), although this testing is done in accordance with steps 72–90 of FIG. 3B.

For such testing of the remaining pattern after the back specific sequence has been stripped off, and for testing if both the first and last characters of the pre-defined pattern are asterisks "*", control passes to step A in FIG. 3B (70). First, the pre-defined pattern is scanned from left to right to find the first character that is not an asterisk "*" (72), to isolate its next specific sequence. If there are no remaining asterisks "*"(74), i.e., there is no specific sequence other than any back specific sequence, then the program exits as a match (76). If there are other specific sequences, i.e., there are other asterisks "*", then the target string is scanned from left to right to find its next specific sequence. That specific sequence is then compared (80) with the corresponding characters in the pre-defined string according to the exact-length rules in steps 36–50, and those results are examined (82). If this check results in a match (84), then the program loops back to check for any other embedded specific sequences. If the check results in a failed match (86), this does not necessarily mean that the program should exit with a fail result, because of the presence of the asterisks "*" in the pre-defined and target strings. Therefore, the starting point for the specific sequence of the user-defined string is shifted one character to the right, and the remaining characters in the specific sequence are checked again by looping back to step 80; if there are no remaining characters in the target string (88), then the program exits with a failed match result (90).

The following table further illustrates how the present invention is distinguished from the prior art:

| Pre-defined string | User-defined string | Prior art | Invention |
| --- | --- | --- | --- |
| ?BCDEFG | *BCDEFG | MATCH | NO MATCH |
| ?BCDEFG | ?BCDEFG | MATCH | MATCH |
| ?BCDEFG | JBCDEFG | MATCH | MATCH |
| AB?C*EF | AB*C*EF | MATCH | NO MATCH |
| AB?C*EF | AB*CLMEF | MATCH | NO MATCH |
| AB?C*EF | AB?C*EF | MATCH | MATCH |
| AB?C*EF | ABJC*EF | MATCH | MATCH |
| AB?C*EF | ABJCLMEF | MATCH | MATCH |
| ABCDFF? | ABCDEF* | MATCH | NO MATCH |
| ABCDEF? | ABCDEF? | MATCH | MATCH |
| ABCDEF? | ABCDEFK | MATCH | MATCH |
| AB?C* | AB*C*EF | MATCH | NO MATCH |
| AB?C* | AB*CLMEF | MATCH | NO MATCH |
| AB?C* | AB?C*EF | MATCH | MATCH |
| AB?C* | ABJC*EF | MATCH | MATCH |
| AB?C* | ABJCLMEF | MATCH | MATCH |

The column "Pre-defined string" sets forth several exemplary wild card patterns which might be specified in a list of patterns (supersets) to be used for network security administration. The column "Target string" sets forth several wild card patterns that might be specified by a user in entering a command. The column "Prior art" shows how literal interpretation of wild card characters in the target string by prior-art programs always results in a match for each of the pairs of pre-defined and target strings. The "Invention" column shows how, when the target wild card pattern is instead read as having active wild card characters, certain pairs of pre-defined and target strings result in no match (match failed). Thus, the present invention prevents the system from inadvertently matching files that are not necessarily intended, contrary to the prior art.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

I claim:

1. A method of comparing first and second character strings associated with computer objects residing in a computer system, wherein the computer objects are selected from the group consisting of computer devices, directories, sub-directories, files, and symbolic links, each of the character strings having at least one wild card character, comprising the step of determining whether the first character string defines a first group of computer objects which is a logical subset of a second group of computer objects defined by the second character string.

2. The method of claim 1 wherein the first character string is provided by a user and the second character string is pre-defined.

3. The method of claim 1 wherein said determining step includes the step of examining whether the second character string has any wild card character which can substitute for one and only one character.

4. The method of claim 1 wherein said determining step includes the step of examining whether the second character string has any wild card character which can substitute for any number of characters, including no characters.

5. The method of claim 1 wherein said determining step includes the step of examining whether the second character string contains any specific sequence of characters having no wild card character which can substitute for any number of characters, including no characters.

6. The method of claim 1 wherein the comparison is performed by a set of software instructions which provide an indication that the first character string matches the second character string if said first group is a logical subset of said second group.

7. The method of claim 3 wherein said determining step further includes the step of examining whether the second character string has any wild card character which can substitute for any number of characters, including no characters.

8. The method of claim 3 wherein said determining step further includes the step of examining whether the second character string contains any specific sequence of characters having no wild card character which can substitute for any number of characters, including no characters.

9. The method of claim 4 wherein said determining step further includes the step of examining whether the second character string contains any specific sequence of characters having no wild card character which can substitute for any number of characters, including no characters.

10. The method of claim 7 wherein said determining step further includes the step of examining whether the second character string contains any specific sequence of characters having no wild card character which can substitute for any number of characters, including no characters.

11. A computer system comprising:

a processor;

a plurality of computer objects residing on one or more devices connected to said processor, said computer objects each having a unique name; and memory means connected to said processor for storing program instructions to determine whether a first character string, which has at least one wild card character and defines a first group of names associated with said computer objects, is a logical subset of a second character string which also has at least one wild card character and defines a second group of names associated with said computer objects.

12. The computer system of claim 11 wherein:

one of the devices is a permanent storage device; and the computer objects are files residing on said permanent storage device.

13. The computer system of claim 11 wherein the computer objects are individual devices.

14. The computer system of claim 11 wherein:

the computer system is a multi-user network; and said first character string is provided by a user of said network; and said second character string is pre-defined.

15. The computer system of claim 11 wherein said program instructions include instructions for examining whether said second character string has any wild card character which can substitute for one and only one character.

16. The computer system of claim 15 wherein said program instructions further include instructions for examining whether said second character string has any wild card character which can substitute for any number of characters, including no characters.

17. The computer system of claim 16 wherein said program instructions further include instructions for examining whether said second character string contains any specific sequence of characters having no wild card character which can substitute for any number of characters, including no characters.

* * * * *